R. W. PRITCHARD.
RIM GUARD FOR TIRES.
APPLICATION FILED JUNE 2, 1920.
1,388,000.
Patented Aug. 16, 1921.
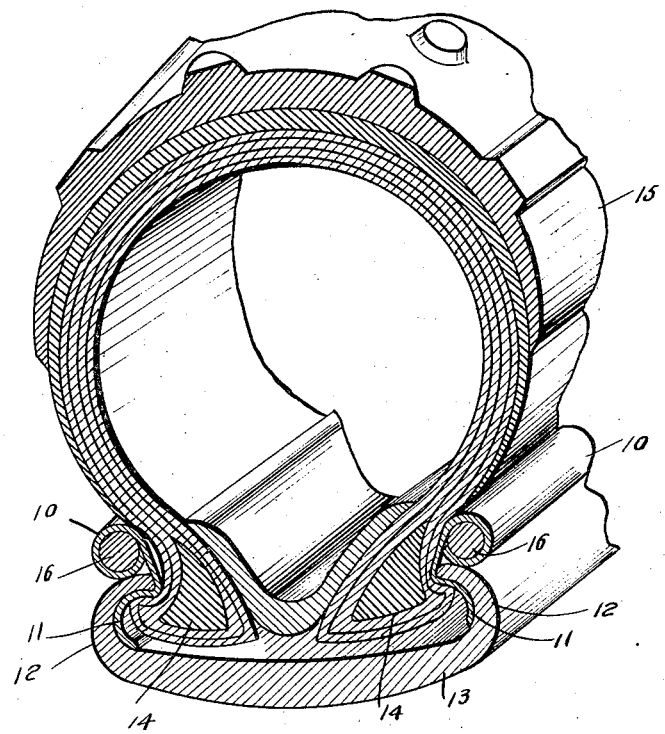
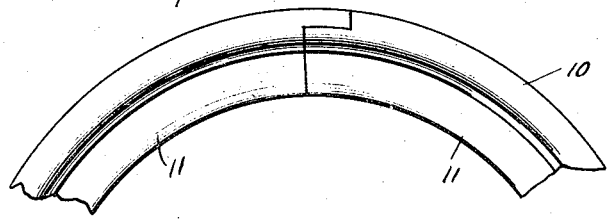
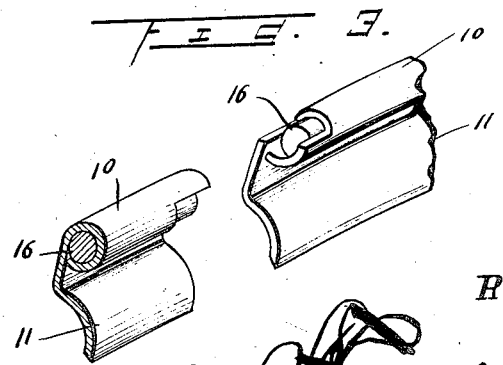
Inventor
R. W. Pritchard.
By
Attorney

UNITED STATES PATENT OFFICE.

RAY W. PRITCHARD, OF BALTIMORE, MARYLAND.

RIM-GUARD FOR TIRES.

1,388,000.  Specification of Letters Patent.  Patented Aug. 16, 1921.

Application filed June 2, 1920. Serial No. 386,129.

*To all whom it may concern:*

Be it known that I, RAY W. PRITCHARD, a citizen of the United States, residing at 2725 Oak street, in the city of Baltimore and State of Maryland, have invented certain new and useful Improvements in Rim-Guards for Tires; and I do hereby declare the following to be a full, clear, and exact description of the invention, such as will enable others skilled in the art to which it appertains to make and use the same.

The object of the invention is to provide a simple and relatively inexpensive attachment for the wheel rims of automobiles and similar vehicles employing pneumatic tires for preventing the rim cutting of the tire particularly when they become deflated or partly deflated and hence lap laterally over the edges of the rim where the latter engages the bead of the tire shoe or casing, and with this object in view, the invention consists in a construction and arrangement of parts of which a preferred embodiment is shown in the accompanying drawing, wherein:

Figure 1 is a sectional perspective view of the device applied in the operative position to a wheel.

Fig. 2 is a side view of the device.

Fig. 3 is a detail view of the joints between the extremities of the guard showing the same separated.

The guard consists essentially of a roll 10 formed of relatively thin or sheet metal extended inwardly and then turned laterally to form a hook shaped flange 11 to lie in contact with the inner surface of the flange 12 of the tire rim 13 which in practice receives the bead 14 of the tire shoe or casing 15. The roll is positioned upon the exterior surface of the flange 12 and any tendency of the tire shoe or casing to fold over the flange is prevented and the shoe is caused to describe a relative broad curve which minimizes the tendency to cut or break due to the weight of the car, said roll being effectively held against displacement by reason of the engagement of the casing bead 14 with the flange 11.

In practice the roll may be provided with a core or filler 16 consisting of a wire or rod of any preferred diameter and at the extremities of the guard the sheet metal casing and core or filler are cut as indicated in Fig. 3 to lie in interlocking relation, so that further fastening means to insure the proper retention of the parts in their desired relations is avoided.

What is claimed is:—

As a means to prevent rim-cutting of a tire, a flange to engage the inner surface of the bead-securing flange of the rim, a flange integral with the first flange extending therefrom over the edge of the bead securing flange and being curled into a tube engaging the exterior of the securing flange whereby the tube and first flange clasp the bead securing flange, said means being resilient and split with overlapping portions at the tube, and a means in the tube extending into the overlapping portions to reinforce them.

In testimony whereof I affix my signature in presence of two witnesses.

RAY W. PRITCHARD.

Witnesses:
 FRANK E. WELSH, Jr.,
 HELEN T. MATULEWICZ.